United States Patent
Zhao et al.

(10) Patent No.: US 7,705,307 B1
(45) Date of Patent: Apr. 27, 2010

(54) THERMAL DISPLACEMENT-BASED RADIATION DETECTOR OF HIGH SENSITIVITY

(75) Inventors: Jing Zhao, Winchester, MA (US); Lei Zhang, Acton, MA (US)

(73) Assignee: Agiltron Corporation, Woburn, MA (US)

( * ) Notice: Subject to any disclaimer, the term of this patent is extended or adjusted under 35 U.S.C. 154(b) by 59 days.

(21) Appl. No.: 11/711,275

(22) Filed: Feb. 27, 2007

Related U.S. Application Data

(60) Provisional application No. 60/776,725, filed on Feb. 27, 2006.

(51) Int. Cl.
*B41J 2/05* (2006.01)

(52) U.S. Cl. .................................. 250/338.1

(58) Field of Classification Search .............. 250/338.1, 250/370.01, 370.08, 330, 332, 352
See application file for complete search history.

(56) References Cited

U.S. PATENT DOCUMENTS

| | | | |
|---|---|---|---|
| 6,080,988 A * | 6/2000 | Ishizuya et al. .......... 250/338.1 |
| 6,339,219 B1 * | 1/2002 | Ishizuya et al. ............. 250/330 |
| 6,456,420 B1 * | 9/2002 | Goodwin-Johansson .... 359/291 |
| 6,664,885 B2 * | 12/2003 | Bromley et al. ............. 337/104 |
| 7,073,890 B2 * | 7/2006 | Cabal et al. .................... 347/54 |
| 7,184,200 B2 * | 2/2007 | Dalakos et al. .............. 359/298 |
| 2004/0035605 A1 * | 2/2004 | Griffith et al. ............... 174/257 |
| 2004/0186382 A1 * | 9/2004 | Modell et al. ................ 600/473 |
| 2005/0011256 A1 * | 1/2005 | Hoh ............................ 73/105 |
| 2005/0162806 A1 * | 7/2005 | Sarkar et al. ................. 361/277 |
| 2006/0046480 A1 * | 3/2006 | Guo ............................ 438/685 |
| 2006/0131500 A1 * | 6/2006 | Dalakos et al. ........... 250/338.1 |
| 2006/0133961 A1 * | 6/2006 | Lim et al. ...................... 422/88 |
| 2007/0086001 A1 * | 4/2007 | Islam et al. .................. 356/301 |
| 2007/0138583 A1 * | 6/2007 | Ofek et al. .................... 257/417 |
| 2007/0262256 A1 * | 11/2007 | Lee ........................... 250/338.1 |
| 2008/0135826 A1 * | 6/2008 | Fonash et al. ................... 257/9 |

\* cited by examiner

*Primary Examiner*—David P Porta
*Assistant Examiner*—Djura Malevic
(74) *Attorney, Agent, or Firm*—Joseph Stecewycz

(57) ABSTRACT

A radiation detector comprises an infrared radiation sensing micro mirror array, where each micro mirror is supported with a deformable cantilever beam having an organic layer for increased dynamic range. The radiation detector includes two or more sources of optical radiation for irradiating the micro mirror array, an image sensor array for receiving optical reflection from the micro mirror array, and an aperture plate for (i) spatially restricting optical radiation reaching the micro mirror array and (ii) spatially restricting reflected optical reflection reaching the image sensor array.

24 Claims, 6 Drawing Sheets

THERMAL DISPLACEMENT-BASED RADIATION DETECTOR OF HIGH SENSITIVITY

CROSS-REFERENCE TO RELATED APPLICATION

The present Application claims the benefit of Provisional Patent Application No. 60/776,725 entitled "Thermal displacement based radiation detector," filed 27 Feb. 2006 and incorporated by reference herein in its entirety.

BACKGROUND OF THE INVENTION

1. Field of Invention

The present invention relates to radiation detection devices and, in particular, to an extended range thermal displacement-based radiation detecting device.

2. Description of the Background Art

Conventional radiation detection devices, such as thermal cameras, may operate using a thermo-electric mechanism to detect radiation signals. For example, an infrared signal distribution may be directed onto a semiconductor imaging device and current or voltage changes may be measured to indicate a temperature rise in each pixel. However, these technologies have major deficiencies. In the present state of the art, the sensitivity of an infrared camera may be fundamentally limited by electron thermal noise.

Cooling may be used to mitigate this limitation, but this additional complexity results in a bulky radiation detection device with high power consumption. Moreover, the fabrication of these devices is intrinsically hampered by the need for an electrical interconnect to each pixel as well as integrated scanning readout electronics. All of these factors have kept the cost prohibitively high for many commercial applications, as well as making the detectors expensive to produce and difficult to scale in array size (i.e., resolution) due to low fabrication yield of the detection sensor.

A new type of thermal detectors based on micro-electrical-mechanical systems (MEMS) has emerged in recent years. This type of IR detectors, in which micromechanical photon detector structures are fabricated by a few steps using conventional materials and processes, have opened an unprecedented opportunity for a low cost state-of-the-art IR imager. The readout can be a capacitive readout such as disclosed in U.S. Pat. No. 5,623,147 issued to Baert et al., or a piezoresistive readout such as disclosed in U.S. Pat. No. 6,118,124 issued to Thundat et al., or an emissive readout such as disclosed in U.S. Pat. No. 6,140,646 issued to Busta et al. However, the requirement of providing an electrical readout contact to the sensor element may reduce sensitivity as a result of thermal signal leak.

A different approach to uncooled thermal imagers based on passive thermal bending and optical readout has been reported. The use of bimaterial microcantilevers for temperature and radiation sensing has been disclosed in Baert et al. '147 and demonstrated by several groups, including Oden 1996, Perazzo 1999, Ishizuya 2002, and Manalis et al 1997. In particular, Manalis fabricated the arrays of bimaterial microcantilevers for infrared imaging and demonstrated direct conversion from an infrared to a visible signal.

This type of approaches utilizes a passive sensor without requiring electrical contacts. One advantage is that electron thermal noise may be reduced and sensor fabrication may be simplified without the need for pixel-level driving circuitry integration. However, early designs, such as disclosed in Thundat et al. '124 and in U.S. Pat. No. 5,929,440 issued to Fisher, use bimaterial cantilevers directly as the sensors are intrinsically and significantly poor in sensitivity; rendering them impractical for commercial applications. In these imager designs, bimaterial cantilevers are exposed to thermal radiation that heats up the cantilevers, leading in turn to bending as a result of the thermal expansion mismatch of the two cantilever materials. The bending can be detected by an optical beam, thus providing a signal proportional to the thermal radiation intensity. However, early designs have had poor radiation absorption efficiency and large sensor mass that lead to inefficient thermal bending devices. This design may also leave the sensor component directly exposed to environmental temperature fluctuation and hence cannot be used as "uncooled."

One type of optical thermal bending imager design has been disclosed by Tohru Ishizuya et al. in U.S. Pat. No. 6,080,988. In this design, the sensing element and the bending portion are separated for optimization. Each sensor pixel is made of an optical absorbing cavity that is supported by two bimaterial cantilevers. The cavity receives infrared radiation and converts infrared rays into heat that conducts into the connecting cantilever arms, resulting in bending respect to the substrate base due to bimetal principle.

In this approach, the radiation is first efficiently converted into heat by the optical cavity sensor, and as the heat conduct into the supporting bimaterial arms, the cantilever arms are then bent corresponding to the heat and thus deflect the read-out light beam accordingly. This design achieves very high sensitivity by separating the absorption and displacement with a high absorption efficient yet lightweight optical cavity and narrow bimaterial cantilever bending strip arms. However, the design lacks many features that are important for practical applications.

For example, the uncooled IR imagers demonstrated to date all require one to two order of magnitude improvements in sensitivity in order to displace the established cryogenically cooled semiconductor IR imagers. No semiconductor materials known today can provide such sensitivity improvement without sacrificing responses time. Having a low thermal sensitivity means that a larger pixel size is required so as to provide adequate thermal absorption. Low thermal sensitivity has also limited the achievable dynamic range in the current state of the art.

What is needed is a thermal displacement radiation detector for radiation detection that provides extremely high IR sensitivity and has low power requirements.

SUMMARY OF THE INVENTION

In one aspect of the present invention, a micro mirror device suitable for responding to a source of infrared radiation comprises: an illumination reflector substantially reflective to illumination of a predetermined range of wavelengths; a thermal pad attached to the illumination reflector for acquiring thermal energy by exposure to the source of infrared radiation; and a cantilever support fabricated from at least two layers of materials, wherein at least one layer of material includes an organic material, the cantilever support being attached to the thermal pad, such that the cantilever support bends in response to receiving thermal energy from the thermal pad and the illumination reflector is tilted with respect to a mounting surface when the cantilever support bends.

In another aspect of the present invention, an infrared radiation sensing device comprises: a substrate; and a plurality of micro mirror devices, each micro mirror operatively coupled to the substrate via a thermally deformable cantilever beam having at least two layers of materials with different coefficients of thermal expansion, wherein at least one layer of material is an organic material.

In yet another aspect of the present invention, a radiation detector comprises: a radiation sensing device including a substrate; a plurality of illumination reflectors, each illumination reflector mounted to the substrate via a thermally deformable cantilever beam having at least two layers of materials with different coefficients of thermal expansion, wherein at least one layer of material is an organic material; a first optical illumination source disposed to irradiate the plurality of illumination reflectors with optical radiation of a first wavelength; a second optical illumination source disposed to irradiate the plurality of illumination reflectors with optical radiation of a second wavelength; an image sensor array disposed to receive reflected optical radiation of the first wavelength and the second wavelength from the plurality of illumination reflectors; and an aperture plate for spatially restricting the optical radiation of the first wavelength and the second wavelength reaching the plurality of illumination reflectors, and for spatially restricting the reflected optical radiation of the first wavelength and the second wavelength reaching the image sensor array.

These and other features, aspects, and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention is related to an optical readout that has significantly larger dynamic temperature sensing range than that of conventional radiation detectors. The innovation is based on the incorporation of sensitive polymer molecular material with a highly efficient micro machined thermal mechanical micro mirror array that directly converts an incident infrared image into a visible image. This performance feature is highly desirable for thermograph and fire-fighting applications, for example. For many applications, including fire fighting, there is a need for a large dynamic range that often exceeds 400 C.°. The disclosed design functions to extend the detection temperature to meet such demanding application requirements.

The disclosed radiation detector provides real-time, continuous sensing of infrared radiation without the need for cooling, potentially offering high resolution that is comparable to cryogenically cooled sensors. The radiation detector may be manufactured with low-cost large-volume processing in standard silicon or MEMS (micro-electromechanical systems) foundries, and packaged using low-cost vacuum packaging technologies. The design incorporates optical readout, which eliminates the above-noted drawbacks of an electronic readout that may introduce additional signal loss due to thermal contacts made to the detector element. Moreover, the disclosed design is simple, compact, lightweight, exhibits low power consumption, is rugged, and has long operating life.

Figure 1:
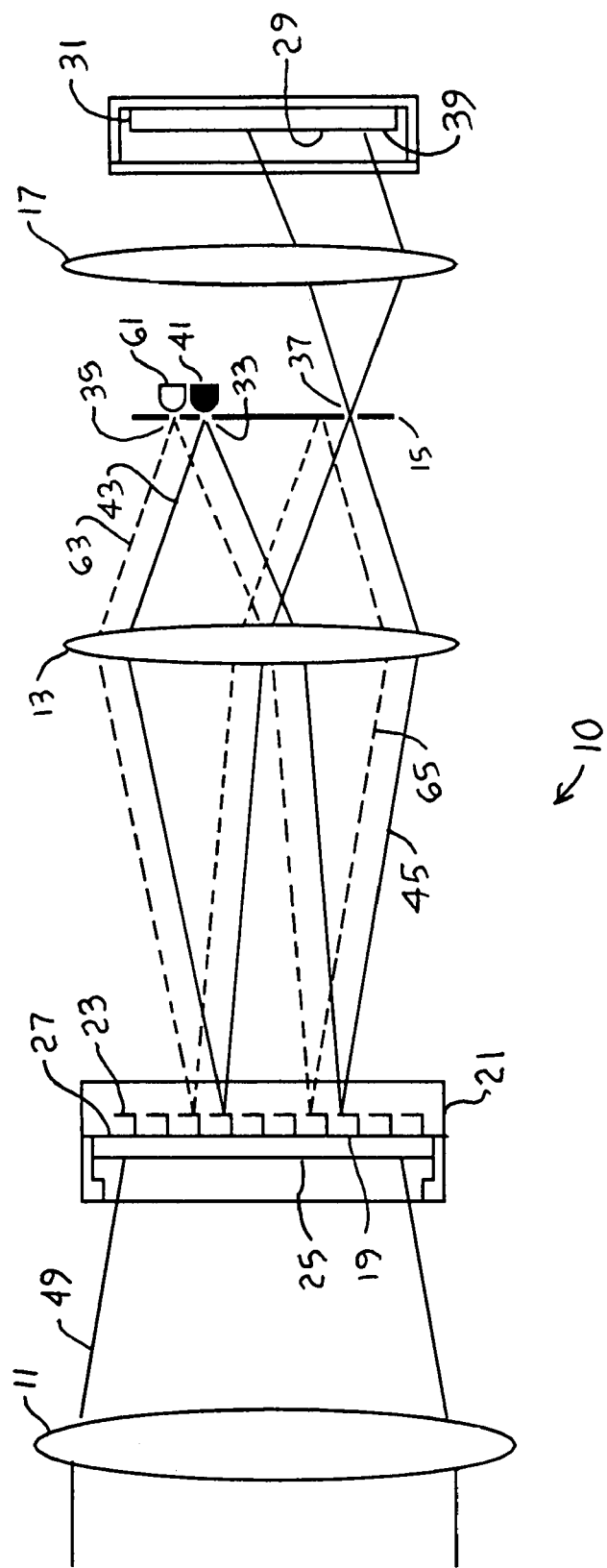
FIG. 1 is a diagrammatical illustration of a radiation detector having an infrared radiation sensing array, in accordance with the present invention.

There is shown in FIG. 1 a diagrammatical schematic of a radiation detector 10 comprising an objective lens 11, an infrared radiation sensing array 21, an imaging lens 13, an aperture plate 15, a collimating lens 17, and an image sensor array 31, in accordance with the present invention. The radiation detector 10 may be used to receive incident radiation 49, such as infrared radiation, and to output an image corresponding to the intensity distribution in the incident radiation 49, as explained in greater detail below. The infrared radiation sensing array 21 comprises a plurality of micro mirrors 23, preferably configured as a rectangular array. The infrared radiation sensing array 21 also includes a substrate 25 for mounting the micro mirrors 23, as explained in greater detail below.

The micro mirrors 23 are reflective to a predetermined range of radiation wavelengths. The orientation of one or more micro mirrors 23 in the infrared radiation sensing array 21 may change in response to thermal energy received from a spatially-variable objective image 19 incident on a mounting surface 27 of the substrate 25, where the substrate 25 is substantially transparent to either or both infrared radiation and terahertz radiation. In an exemplary embodiment, the objective lens 11 may comprise an infrared lens for use with near-infrared to long-wave infrared radiation, but it can be appreciated by one skilled in the art that the radiation detector 10 may be readily adapted for use with other wavelengths, such as terahertz wavelengths.

The image sensor array 31 comprises a plurality of image sensors. The radiation detector 10 functions to convert the objective image 19 into an output image 29 on a sensor array surface 39 of the image sensor array 31. The image sensor array 31 is preferably configured in a rectangular array similar to the rectangular array configuration of the infrared radiation sensing array 21, where there is at least one image sensor corresponding to each micro mirror 23. In an exemplary embodiment, there is provided from four (e.g., a 2×2 array) to nine (e.g., a 3×3 array) image sensors in the image sensor array 31 for each corresponding micro mirror 23 in the infrared radiation sensing array 21. Under operating conditions in which the incident radiation 49 is not present, the image sensor array 31 may provide a uniform optical signal output as an indication that no image is being detected.

The image sensor array 31 may, in turn, transmit the output image 29 as corresponding imaging information or an optical readout to a signal processor or other data collection system (not shown) as well known in the relevant art. In an exemplary embodiment, the output image 29 may be produced on the sensor array surface 39 by the operational steps of: (i) providing first optical radiation 43 from a first optical radiation source 41; (ii) providing second optical radiation 63 from a second optical radiation source 61; (iii) reflecting the first optical radiation 43 and the second optical radiation 63 from the micro mirrors 23; and (iv) projecting either or both a first reflected radiation 45 and second reflected radiation 65 onto the sensor array surface 39 when the spatially-variable objective image 19 is present on the mounting surface 27.

In an exemplary embodiment, the first optical radiation source 41 may comprise a light-emitting diode (LED) operating at a first wavelength, such as red light, and the second optical radiation source 61 may comprise a light-emitting diode operating at a second wavelength, such as green light. The image sensor array 31 may comprise an array of semiconductor-based imaging devices, such as charge-coupled devices (CCDs), photodiodes, or complementary metal-oxide semiconductor (CMOS) devices. Each semiconductor-based device is preferably sensitive to the radiation emitted by either the first optical radiation source 41 or the second optical radiation source 61.

The aperture plate 15 may be disposed in an optical path between the array of micro mirrors 23 and the image sensor array 31. The first optical radiation source 41 may be positioned so as to allow a predetermined amount of the first optical radiation 43 to pass through a first source aperture 33 in the aperture plate 15. Similarly, the second optical radiation source 61 may be positioned so as to allow a predetermined amount of the second optical radiation 63 to pass through a second source aperture 35 in the aperture plate 15. The imaging lens 13 may be disposed in an optical path between the aperture plate 15 and the micro mirrors 23 for projecting the first optical radiation 43 and the second optical radiation 63 onto the micro mirrors 23. The imaging lens 13 may also function to project the first reflected radiation 45 and the second reflected radiation 65 onto the sensor array surface 39 via an imaging aperture 37 in the aperture plate 15. The imaging aperture 37 may function to allow only predetermined portions of the first reflected radiation 45 and the second reflected radiation 65 to pass to the image sensor array 31.

Operation of the infrared radiation sensing array 21 can be described with reference to the simplified diagrammatical illustrations of FIGS. 2-5. The imaging lens 13 and the collimating lens 17 are not shown, for clarity of illustration, and it should be understood that simplified optical paths are provided for descriptive purposes only and are not otherwise representative of the actual optical paths passing through the imaging lens 13 and the collimating lens 17. The first optical radiation source 41 and the second optical radiation source 61 may be constantly powered, providing for a continuous image being reflected from the micro mirrors 23. A corresponding readout or sampling of the output image 29 may be determined by an operator of the radiation detector 10.

Figure 2:
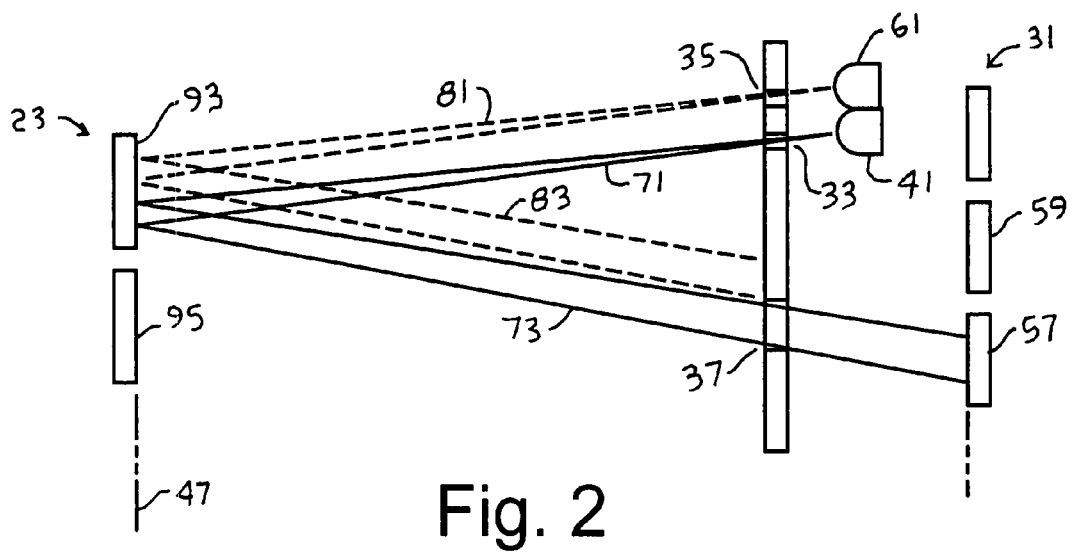
FIGS. 2-5 are simplified diagrammatical illustrations showing the response to thermal input by a micro mirror in the infrared radiation sensing array of FIG. 1.

FIG. 2 illustrates the case in which the incident radiation 49 is either not present or is of sufficiently low intensity that the objective image 19 formed on the mounting surface 27 provides essentially no thermal energy to change the initial or default orientation of the micro mirrors 23. That is, when the incident radiation 49 is not irradiating the mounting surface 27 (shown in FIG. 1), reflecting surfaces of the micro mirrors 23 lie substantially in a plane defined as a default mirror surface plane 47. The first optical radiation 43, emitted by the first optical radiation source 41, illuminates an illumination reflector 93 of one of the micro mirrors 23. In particular, a portion of the first optical radiation 43, herein referred to as a first beam 71, may be reflected by the illumination reflector 93.

A corresponding first reflected beam 73 travels from the illumination reflector 93 and passes through the imaging aperture 37 to irradiate a corresponding image sensor 57, such as a CCD or CMOS device, in the image sensor array 31. In particular, the image sensor 57 is sensitive to the radiation wavelength emitted by the first optical radiation source 41. Similarly, a portion of the second optical radiation 63, herein referred to as a second beam 81 (shown in dashed lines for clarity of illustration), is emitted by the second optical radiation source 61 and may be reflected by the illumination reflector 93. A corresponding second reflected beam 83 may travel from the illumination reflector 93 and may terminate on a surface of the aperture plate 15, as shown.

Because the first optical radiation 43 emitted by the first optical radiation source 41 is incident on all the micro mirrors 23, another portion (not shown) of the first optical radiation 43 may be reflected by an adjacent illumination reflector 95, for example, and may pass through the imaging aperture 37 to irradiate a second image sensor 59 in the image sensor array 31. Other portions of the first optical radiation 43 may be similarly reflected by other micro mirrors 23, may pass through the imaging aperture 37, and may irradiate corresponding image sensors in the image sensor array 31. It can be appreciated that FIG. 2 illustrates the operating condition in which the image sensor array 31 provides a uniform optical signal output, or imaging information, in response to the first optical radiation 43 reflected from the micro mirrors 23, when the incident radiation 49 is not present.

In the case when the incident radiation 49 is irradiating the mounting surface 27 to form the objective image 19, a portion of the radiant energy transmitted by the incident radiation 49 may be converted into a spatially-varying thermal energy distribution (corresponding to the intensity level distribution of the objective image 19) on the mounting surface 27. This spatially-varying thermal energy distribution may cause temporary physical deformation of one or more cantilever supports (not shown) attached to individual micro mirrors 23 in the infrared radiation sensing array 21. The deformation of supports may, in turn, cause one or more of the micro mirrors 23 to move out of the default mirror surface plane 47, as described in greater detail below.

Figure 3:
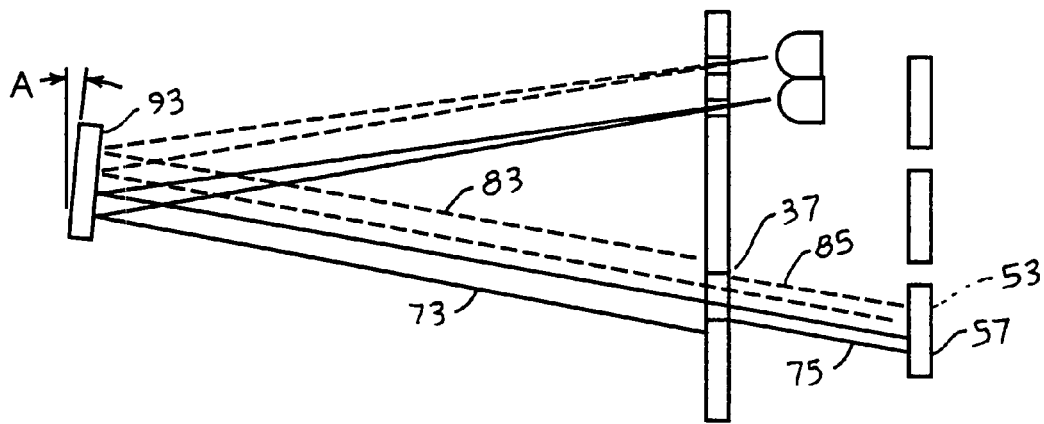

FIG. 3 illustrates the case in which the incident radiation 49 is of sufficient intensity to project onto the mounting surface 27 a spatially-varying thermal energy distribution corresponding to the objective image 19, where the radiation intensity at the illumination reflector 93 has exceeded a predetermined detection threshold. Accordingly, some of the thermal energy in the objective image 19 may function to deform the cantilever support attached to the particular micro mirror 23. In this case, the illumination reflector 93 has deflected, or rotated, out of the default mirror surface plane 47, as indicated by an angle 'A', and caused the first reflected beam 73 and the second reflected beam 83 to move relative to the imaging aperture 37.

This movement results in reducing the amount of the first reflected beam 73 passing though the imaging aperture 37 and, accordingly, produces a first attenuated beam 75 projected onto the associated image sensor 57. This movement also allows a small portion of the second reflected beam 73 to enter the imaging aperture 37 to produce a second attenuated beam 85 projected onto an image sensor 53 (not seen in the illustration), disposed adjacent to the image sensor 57. The deflection of the illumination reflector 93 by the angle 'A' thus results in the first attenuated beam 75 illuminating the image sensor 57, which is sensitive to radiation emitted by the first optical radiation source 41. The deflection of the illumination reflector 93 by the angle 'A' also results in the second attenuated beam 85 illuminating the image sensor 53, which is sensitive to radiation emitted by the second optical radiation source 61.

Accordingly, a first signal output obtained from the image sensor 57 may vary accordingly as the intensity of the first reflected beam 73, in FIG. 2, is reduced to the intensity of the attenuated beam 75, in FIG. 3. Additionally, at the same time, a second signal output may be produced at the image sensor 53 as the intensity of the second reflected beam 83 irradiating the image sensor 53 increases, in comparison to the case of FIG. 2. The spatially-varying radiation intensity level present in the incident radiation 49 can thus be determined from analyzing the corresponding spatially-varying imaging signals of the output image 29 on the sensor array surface 39. In an exemplary embodiment, detecting a decreasing signal from the image sensor 57 while the signal from the image sensor 53 is increasing may be used to indicate a higher or rising intensity level in the localized portion of the incident radiation 49 forming a part of the objective image 19 at the illumination reflector 93.

Figure 4:
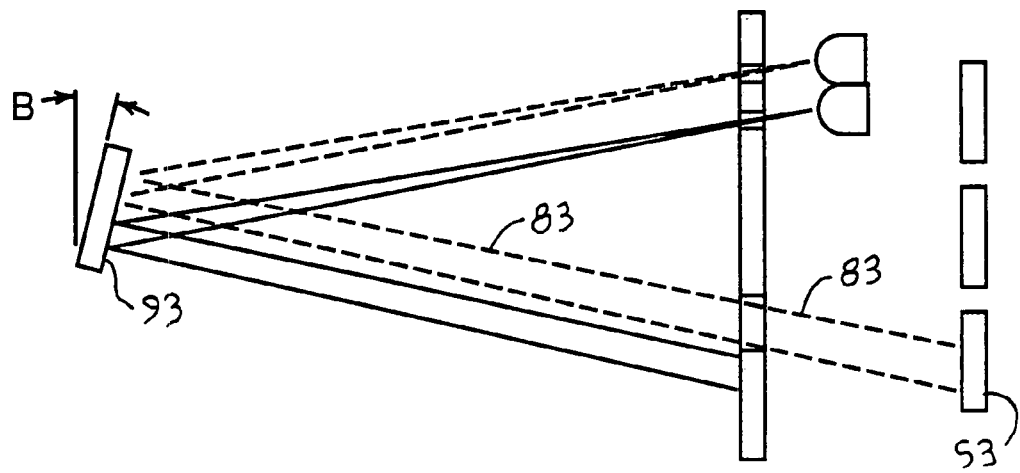

FIG. 4 illustrates the case in which the intensity of the incident radiation 49 at the illumination reflector 93 is at a higher intensity than in the case shown in FIG. 3. If a larger amount of thermal energy is applied to the mirror cantilever support for the illumination reflector 93, in comparison to the case of FIG. 3, the illumination reflector 93 may rotate or deflect further, as indicated by the larger angle 'B.' This action serves to project most or all of the reflected beam 73 onto the aperture plate 31 rather than through the imaging aperture 37. Accordingly, the signal or imaging information at the image sensor 57 (not shown) does not change with any additional deflection or rotation of the illumination reflector 93.

Preferably, the rotation of the illumination reflector 93 shown in FIG. 4 may also act to project essentially all of the reflected beam 83 through the imaging aperture 37 and onto the image sensor 53. A corresponding signal or other useful imaging information can thus provided at the image sensor 53 for deflections of the illumination reflector 93 of angle 'B' or greater. That is, as the first reflected beam 73 from the first optical radiation source 41 becomes attenuated in response to higher localized intensity levels in the incident radiation 49, the second reflected beam 83 from the second optical radiation source 61 is moved over the imaging aperture 37 and partially transmitted to the image sensor 53.

Figure 5:
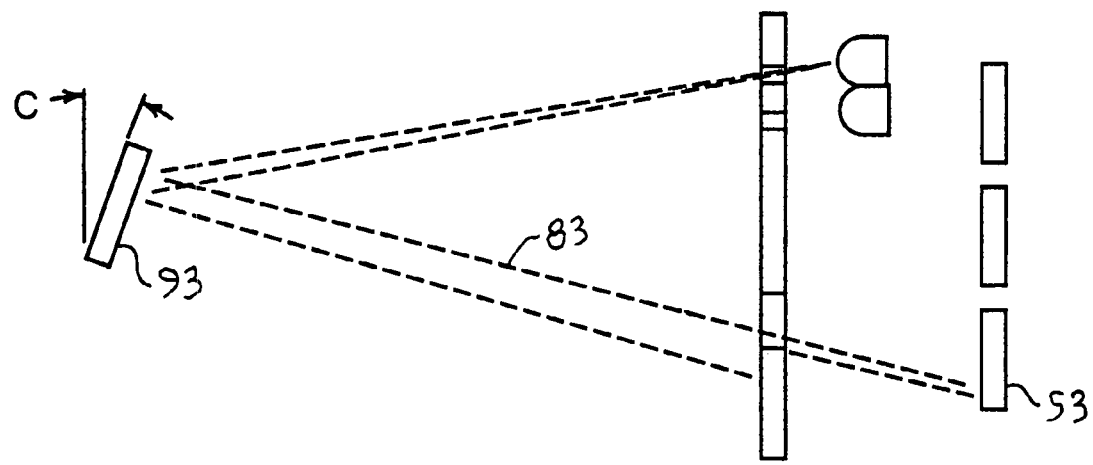

As shown in FIG. 5, further rotation of the illumination reflector 93, to an angle 'C' or greater, serves to attenuate the signal produced at the image sensor 53. Thus, the image sensor 57 may be used to indicate rotation or deflection of the illumination reflector 93 over the approximate angular range of from zero degrees to about angle 'B,' and the image sensor 53 may be used to indicate rotation or deflection of the illumination reflector 93 over the approximate angular range of from about angle 'A' to about angle 'C,' By using both the first optical radiation source 41 and the second optical radiation source 61 to produce signals at the image sensors 57 and 53, the effective range of the radiation detector 10 has been essentially doubled in comparison to conventional radiation detectors. As explained in greater detail below, the use of an organic layer in the structure used to support the illumination reflector 93 provides for the greater range of rotation or deflection, or a greater sensitivity, of the illumination reflector 93. It can be appreciated by one skilled in the art that the configuration of the radiation detector 10 shown in FIG. 1 can be readily modified to include three or more optical radiation sources, and thus further expand the effective detection range to a dynamic imaging range of 10,000 or greater.

The radiation imaging system 10 thus utilizes the optical system comprising the imaging lens 13, the aperture plate 15, and the collimating lens 17 to simultaneously sense the deflections of all the micro mirrors 23 in the infrared radiation sensing array 21. This may be accomplished by projecting onto the image sensor array 31 an intensity distribution, or image, representative of the spatially-varying objective image 19 projected onto the mounting surface 27. The configuration of the radiation detector 10 can thus be used to effectively convert a spatially-varying infrared or terahertz image into a corresponding spatially-varying image at visible wavelengths (i.e., the wavelengths of the optical radiation sources 41 and 61).

Figure 6:
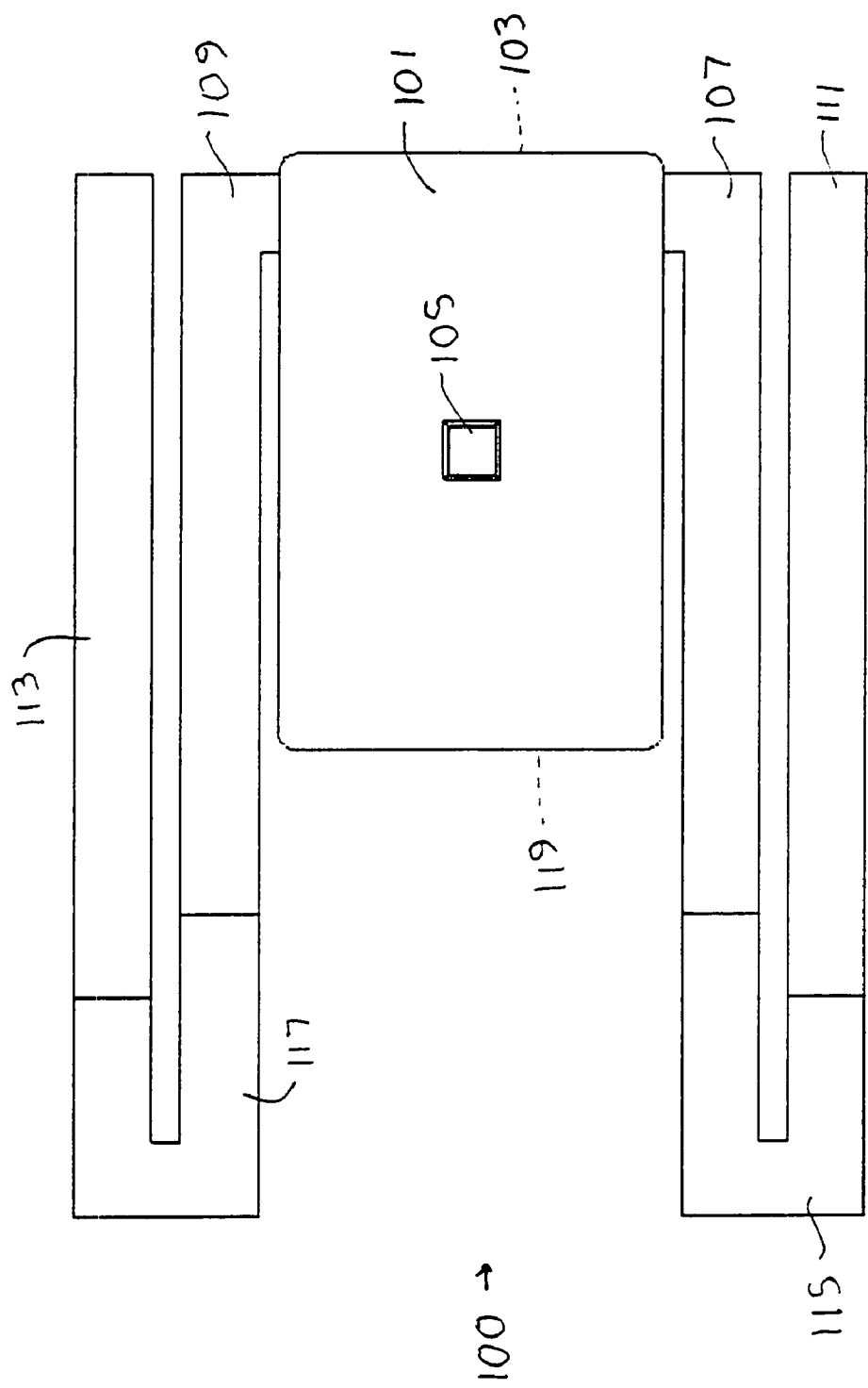
FIG. 6 is a perspective diagrammatical view of an exemplary embodiment of a micro mirror device with an illumination reflector functioning as described in FIGS. 2-5, in accordance with the present invention.

FIG. 6 is a diagrammatical illustration showing an exemplary embodiment of a micro mirror device 100 that can be used in the infrared radiation sensing array 21 of the radiation detector 10 disclosed above. The micro mirror device 100 includes a generally rectangular illumination reflector 101 attached to a thermal pad 103 (hidden from view) by a stand-off support 105. The resulting space between the illumination reflector 101 and the thermal pad 103 may form an IR absorber cavity 119. The IR absorber cavity 119 may function to absorb and retain thermal energy provided to the micro mirror device 100 by the localized portion of the objective image 19 projected onto the mounting surface 27.

Thermal energy absorbed by and retained in the IR absorber cavity 103 may be conducted to a first thermally deformable cantilever beam 107 and a second thermally deformable cantilever beam 109. The structure of the thermally deformable cantilever beams 107 and 109 includes an organic layer, as described in greater detail below. As the thermal energy is received by the first thermally deformable cantilever beam 107 and the second thermally deformable cantilever beam 109, corresponding deformation or bending of the beams occurs and, in response, the micro mirror device 100 may deflect or rotate out of the default mirror surface plane 47, as described above with reference to FIGS. 2-5.

The micro mirror device 100 may also include a first compensation beam 111 and a second compensation beam 113 to compensate for ambient thermal energy, such as may be present from a housing structure enclosing the radiation detector 10. The first thermally deformable cantilever beam 107 may be connected to the first compensation beam 111 by a first thermal insulator 115. Similarly, the second thermally deformable cantilever beam 109 may be connected to the second compensation beam 113 by a second thermal insulator 117. The first thermal insulator 115 and the second thermal insulator 117 have predetermined thermal resistances and may function to impede flow of thermal energy between the respective thermally deformable cantilever beams and the respective compensation beams. The thermal pad 103, stand-off support 105, thermally deformable cantilever beams 107 and 109, the compensation beams 111 and 113, and the thermal insulators 115 and 117 comprise a thermally deformable cantilever support for the illumination reflector 101.

Figure 7:
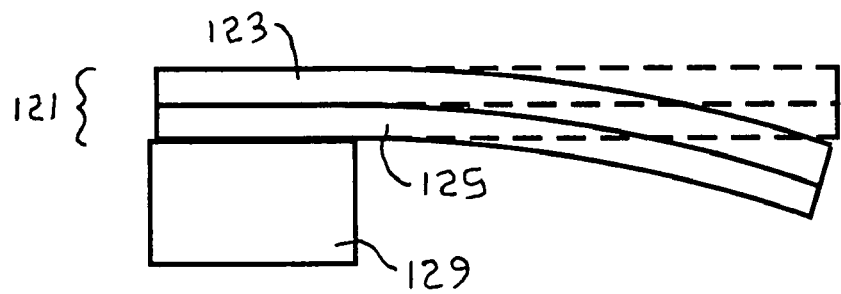
FIG. 7 is simplified diagram of component layers forming a conventional bimaterial cantilever beam, in accordance with the present state of the art.

There is shown in FIG. 7 a simplified diagram of a conventional bimaterial cantilever support 121 attached to a substrate 129. The bimaterial cantilever support 121 typically comprises two layers of materials, such as an aluminum layer 123 and a silicon nitride (SiN) layer 125, each material having a different coefficient of expansion. When radiation is incident upon the bimaterial cantilever support 121, or when thermal energy is conducted into the bimaterial cantilever support 121, the aluminum layer 123 expands at a greater rate than the silicon nitride layer 125 and the bimaterial cantilever support 121 bends towards the substrate 129, as shown.

Figure 8:
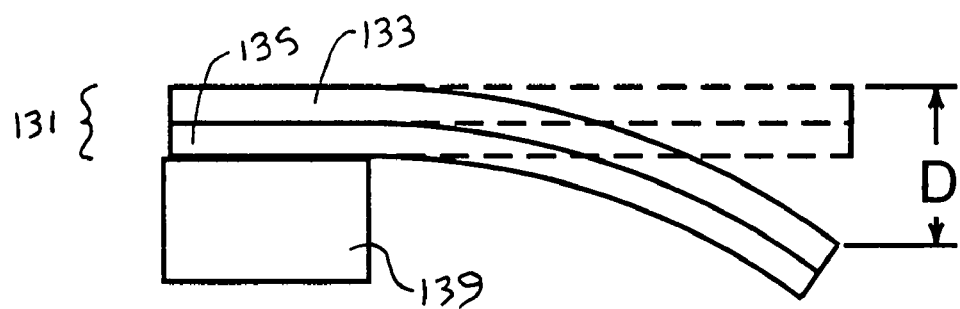
FIG. 8 is a simplified diagram of component layers forming a thermally deformable cantilever beam such as can be used in the micro mirror device of FIG. 6, in accordance with the present invention.

FIG. 8 is a simplified diagram showing an exemplary embodiment of a thermally deformable cantilever beam 131 mounted to a substrate 139, such as may be used in the infrared radiation sensing array 21 of the radiation detector 10 described above. The thermally deformable beam 131 comprises an organic layer 133 disposed on a silicon nitride layer 135. This configuration may be particularly suitable for an organic material that exhibits a good adhesion to silicon nitride. Alternatively, the organic layer 133 may be deposited on a layer of silicon oxide or on a layer of gold. When thermal energy flows to the thermally deformable cantilever beam 131, the thermally deformable cantilever beam 131 may bend toward the substrate 139, as indicated by a displacement parameter "D."

Table 1 lists thermal sensitivity properties for selected inorganic and organic materials as may be used in fabrication of a thermally deformable cantilever beam in accordance with the present invention,

TABLE 1

Material Properties

| Material | EM | PR | α | ST | NETD |
|---|---|---|---|---|---|
| Poly Si | 160 | 0.2 | 2.6 | NA | NA |
| SiN$_x$ | 385 | 0.25 | 0.8 | NA | NA |
| SiO$_x$ | 100 | 0.25 | 0.4 | NA | NA |
| Au | 80 | 0.3 | 14.2 | 0.068 | 154 |
| Al | 69 | 0.3 | 23.6 | 0.105 | 100 |
| Polymers | 1-10 | 0.5 | 100-500 | 2.165 | 5 | where:
EM is the elastic modulus, in Gpa;
PR is Poisson's Ratio;
α is the thermal expansion coefficient, in $10^{-6} K^{-1}$;
ST is theoretical maximum thermal sensitivity, in μm/mK; and
NETD is theoretical noise equivalent temperature difference, in mk.

It can be seen that the theoretical thermal sensitivity is approximately 0.105 μm/K for aluminum material as used in an Al/SiN bimaterial structure. Using an optical readout with 10 nm resolution, the temperature sensitivity of a infrared sensing device using aluminum as the higher thermal expansion layer in a cantilever beam is thus limited to around 100 mK. In comparison, an organic material, such as a polymer, may have a thermal sensitivity (ST) of about 2.165 μm/K and a corresponding thermal expansion coefficient (α) of about 100 to 500 (×$10^{-6}$/K), that is, at least five times greater than the thermal expansion coefficient of an inorganic material, such as aluminum.

It can be appreciated that, by using an organic material in place of aluminum, an approximately twenty-fold enhancement in thermal sensitivity can be realized in a thermally deformable cantilever beam. That is, temperature sensitivity as low as 5 mK may be realized by using the 10 nm resolution optical readout. This operational enhancement can be used to either: (i) reduce the size of the illumination reflector 101, or (ii) to increase the thermal sensitivity of the micro mirror device 100 to a few mK.

In accordance with parameters presented in Table 1, the organic layer 133 in the thermally deformable cantilever beam 131 expands at a comparatively greater rate than the aluminum layer 123 of the bimaterial cantilever support 121, in FIG. 7. Accordingly, the resulting bending range of the thermally deformable cantilever beam 131 is comparatively greater than the bending range of the bimaterial cantilever support 121, in response to a given input of thermal energy. Consequently, for the same incident radiation 49, a micro mirror mounted to a cantilever beam having an organic layer will be rotated through a greater angle than a micro mirror attached to the bimaterial cantilever support 121. By using thermally deformable cantilever beams 131 attached to respective micro mirrors 23 in the infrared radiation sensing array 21, shown in FIG. 1, the radiation detector 10 can provide a response across a correspondingly greater range of radiation intensity and, further, may have a greater sensitivity to a given incident radiation input than if the conventional bimaterial cantilever support 121 were used.

In an exemplary alternative embodiment, inorganic nanoparticles, such as gold and silver nanoparticles, or single-walled carbon nanotubes may be incorporated with the organic layer 133 in the thermally deformable cantilever beam 131 to make a composite coating. The metal nanoparticles and nanotubes may increase thermal absorption, as well as increasing the overall strength (modulus) of the organic layer 133. Furthermore, the metal nanoparticles may advantageously increase the reflectivity of the organic layer 133. This attribute may improve efficiency of the infrared radiation sensing array 21 as the deflection of the illumination reflectors is optically monitored.

Figure 9:
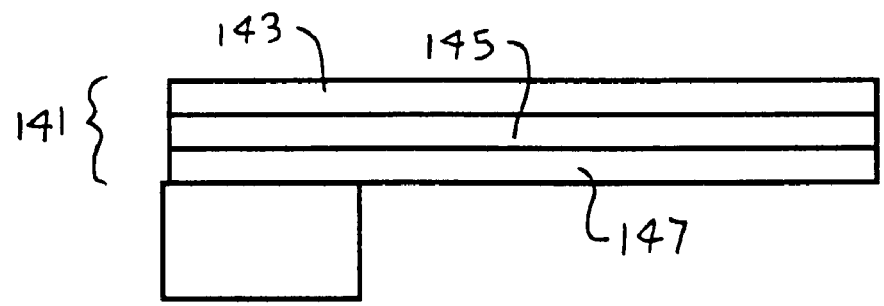
FIG. 9 is a simplified diagram of component layers forming an alternative exemplary embodiment of a cantilever beam, such as can be used in the micro mirror device of FIG. 6, in accordance with the present invention.

In another alternative exemplary embodiment of the present invention, shown in simplified diagrammatical form in FIG. 9, a trimaterial cantilever beam 141 comprises an aluminum layer 145 disposed between an organic layer 143 and a silicon nitride layer 147. This trimaterial configuration may be preferable for an organic layer 143 that has a greater adhesion to aluminum than to silicon nitride. In an alternative embodiment of the radiation detector 10, trimaterial cantilever beams 141 can be used to support one or more of the micro mirrors 23 in the infrared radiation sensing array 21.

Figure 10:
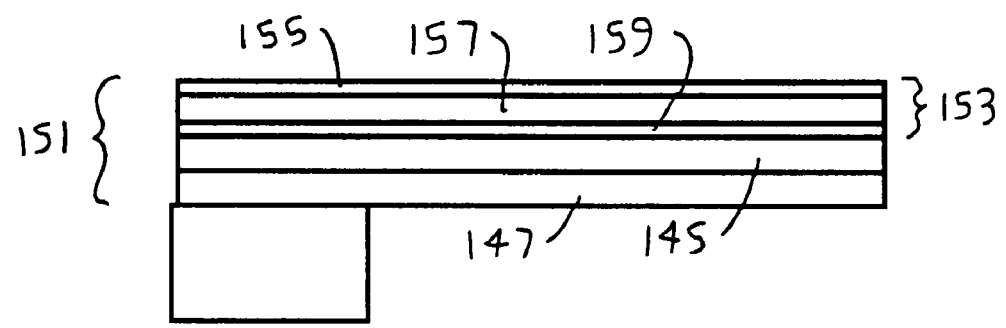
FIG. 10 is a simplified generalized diagram of another alternative exemplary embodiment of component layers forming a thermally deformable cantilever beam, such as can be used in the micro mirror device of FIG. 6, in accordance with the present invention.

FIG. 10 is a simplified diagrammatical cross-sectional view of a further alternative exemplary embodiment of a thermally deformable cantilever beam 151. The thermally deformable cantilever beam 151 includes a compliant, free-suspended, multilayered, mechanosensitive membrane structure 153. The configuration shown may be particularly suitable for a fabrication process that utilizes "wet deposition." The membrane structure 153 comprises a highly compliant surface protection layer 155 having an approximate thickness of from ten to 500 nm. The surface protection layer 155 functions to provide strong adsorption of IR radiation and lateral stiffness. A mechanosensitive interlayer 157 serves to transduce dissipated thermal energy in lateral thermal expansion information about local mechanical stresses to an external detection scheme. A buffer layer 159 serves to provide robust grafting of the membrane structure 153 to a solid substrate, such as the aluminum layer 145 shown, or alternatively, directly to the silicon nitride layer 147. The buffer layer 159 may serve as an interfacial zone between the compliant membrane structure 153 and the solid surface of the aluminum layer 145 or the silicon nitride layer 147.

It is known in the art to use organic materials such as polymers in micro-fabrications as a sacrificial layer. U.S. Pat. Nos. 6,655,834 and 5,130,542, for example, disclose the use of a polymer as electrical conductive layer. U.S. Pat. Nos. 5,047,644 and 5,618,737 disclose the use of a polymer as a thermal isolation layer. U.S. Pat. No. 6,935,165 discloses the use of a polymer layer as a biological sensing layer. However, it does not appear that any application in the prior art uses polymers as a thermal material for micro mirror cantilever fabrications.

Referring again to the organic layer 133 and the organic layer 143 in FIGS. 8 and 9, respectively, at least two methods are available to deposit organic material and polymers onto underlying structure: grafting, and plasma-enhanced chemical vapor deposition (PECVD). The advantages of the grafting method are that many organics with functional groups are available for deposition with the grafting method. In addition, the organic layers may be attached to the substrate with covalent, chemical bonds. No expensive fabrication equipment is normally required, and nanocomposite coatings can be easily fabricated. It can, however, be appreciated that the grafting method is a wet technique requiring one or more solvents, which may make it difficult to produce a layer having a thickness exceeding a predefined limit.

The method of plasma-enhanced chemical vapor deposition does not require use of a solvent and is thus more likely to be compatible with established microfabrication processes. Plasma polymerization is also a dry process, not requiring solvents, that may produce an organic film having high solvent resistance, pinhole-free surfaces, scratch resistance, corrosion resistance, and excellent thermal and chemical stability, along with excellent substrate adhesion.

In accordance with the present invention, there are several criteria for selecting synthetic macromolecular materials for compliant multilayered coatings as disclosed above with reference to FIG. 10. Among the primary considerations is the requirement that compliant materials should be processable through wet chemistry, vapor phase chemistry, and self-assembly. In addition, the candidate organic should be able to form free-suspended films that are continuous, ultrathin, and uniform.

Thermomechanical parameters for an exemplary organic material include: (i) high linear elastic deformation to at least 20%, that is, high bending deformation with linear response; (ii) a high thermal expansion coefficient, typically approximately $10^{-4}$ grad$^{-1}$, for preferred sensitivity; (iii) a high elastic modulus of greater than 1000 Mpa, so as to provide modest stresses; (iv) a Poisson's ratio of at least 0.5, to provide a low tendency to plastic deformation; (v) a high yield strength, to assure low creep at high elastic deformation levels; and, (vi) low thermal conductivity, for low dissipation of thermal energy.

In a preferred embodiment, any one or more of the following chemical groups may be used to form an organic layer: (i) amorphous and nanodomain polymers with light chemical and physical cross-linking; (ii) highly elastic styrene-butadiene and styrene-block copolymers with functional maleic groups (SEBS) to form the thermal-sensitive interlayer; (iii) cross-linked polyisoprenes; and (iv) components performing selective absorption of IR radiation, which contain fluoro- or siloxane-fragments. In addition, poly-(vinylidene fluoride) copolymers with strong absorption in the wavelength of the incident radiation 49 can be used as an effective IR absorber coating. Among preferred monomers suitable for fabricating the organic layers 133, 143, and 155, optionally using a PECVD process, are: styrene, acrylonitrile, pentafluorostyrene, methyl methacrylate, methacrylonitrile, benzonitrile, trimethylsilyl acetylene, and trimethylsilyl acetonitrile.

In an alternative exemplary embodiment, microspherical particles may be used alternating with compliant organic compound or polymers to create a highly anisotropic lattice. Hollow microspheres or foam-like coatings with "reverse opal" microstructure having appropriate gas trapped within the free volume of the microsphere can also be used in the organic layer. These configurations provide for more effective absorption of IR radiation transferred to the lattice expansion and enhance thermal expansion ability due to a reduced presence of solid materials in the organic layer.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A device suitable for responding to a source of infrared radiation, said device comprising:
   an illumination reflector substantially reflective to illumination of a predetermined range of wavelengths;
   an absorbing structure for acquiring thermal energy from exposure to the source of infrared radiation; and
   a cantilever support attached to said illumination reflector, said cantilever support fabricated from at least two layers of materials, wherein one of said at least two layers of materials is an organic material having nanoparticles incorporated therein to form a composite coating such that said at least two layers of materials have different thermal expansion coefficients whereby said cantilever support tilts said illumination reflector in response to receiving thermal energy from said absorbing structure.

2. The device according to claim 1 wherein said cantilever support comprises a buffer layer disposed between a first said layer of material and a second said layer of material.

3. The device according to claim 1 wherein said organic material comprises a member of the group consisting of: styrene, acrylonitrile, pentafluorostyrene, methyl methacrylate, methacrylonitrile, benzonitrile, trimethylsilyl acetylene, and trimethylsilyl acetonitrile.

4. The device according to claim 1 wherein said nanoparticles comprise at least one of: gold nanoparticles, silver nanoparticles, and single-walled carbon nanotubes.

5. The device according to claim 1 wherein said organic material has a thermal expansion coefficient at least four times as great as a thermal expansion coefficient of a different said layer of material.

6. The device according to claim 1 wherein said cantilever support comprises a surface protection layer disposed on an organic material, said organic material disposed between said surface protection layer and a buffer layer.

7. An infrared radiation sensing device comprising:
   a mounting surface; and
   a micro mirror operatively coupled to said mounting surface via a thermally deformable cantilever support having at least two layers of materials with different thermal expansion coefficients, wherein one of said at least two layers of materials is an organic material having nanoparticles incorporated therein to form a composite coating.

8. The infrared radiation sensing device according to claim 7 wherein said organic material comprises a compound from the group consisting of: an amorphous and nanodomain polymer with light chemical and physical cross-linking, a styrene-butadiene and styrene-block copolymer with functional maleic groups, a cross-linked polyisoprene, a compound containing fluoro fragments, and a compound containing siloxane fragments.

9. The infrared radiation sensing device according to claim 7 wherein said micro mirror device comprises an absorbing structure for retaining thermal energy provided by said infrared radiation.

10. The infrared radiation sensing device according to claim 7 wherein said cantilever support further comprises a surface protection layer, a mechanosensitive interlayer, and a buffer layer functioning as an interfacial zone between a compliant membrane structure and a solid surface.

11. A radiation detector comprising:
   an optical device supported by a thermally deformable cantilever beam and capable of being tilted over at least a first range of angles and a second range of angles, said cantilever beam including a composite coating formed from an organic material having nanoparticles incorporated therein;

a first optical illumination source disposed to project illumination of a first wavelength onto a sensor via said optical device when said optical device is tilted within said first range of angles; and a second optical illumination source disposed to project illumination of a second wavelength onto said sensor via said optical device when said optical device is tilted within said second range of angles, such that said second optical illumination device functions to increase the operating sensitivity of said radiation detector.

12. The radiation detector according to claim 11 further comprising an aperture plate having at least one aperture disposed to spatially restrict illumination emitted by said first optical illumination source for detection by said sensor.

13. The radiation detector according to claim 12 wherein said aperture plate is disposed in an optical path between said first optical illumination source and said sensor.

14. The radiation detector according to claim 12 wherein said aperture plate comprises:

a first aperture disposed in an optical path between said first optical illumination source and said optical device; and a second aperture disposed in an optical path between said optical device and said sensor.

15. The radiation detector according to claim 11 wherein said optical device comprises an illumination reflector.

16. The radiation detector according to claim 11 wherein said first optical illumination source comprises a light emitting diode.

17. A radiation detector comprising an illumination reflector including a cantilever support responsive to incident radiation, said illumination reflector having a first layer with a first thermal expansion coefficient and a second layer with a second thermal expansion coefficient, wherein said first layer is formed from an organic material having nanoparticles incorporated therein to form a composite coating such that said first thermal expansion coefficient is at least as four times as great as said second thermal expansion coefficient so as to increase the sensitivity of said radiation detector.

18. The radiation detector according to claim 17 wherein said organic material comprises a member of the group consisting of: styrene, acrylonitrile, pentafluorostyrene, methyl methacrylate, methacrylonitrile, benzonitrile, trimethylsilyl acetylene, and trimethylsilyl acetonitrile.

19. A method of increasing the sensitivity of an infrared radiation detector that operates by tilting an illumination reflector, said method comprising the step of providing a cantilever support for the illumination reflector, said cantilever support fabricated from at least two layers of materials having different thermal expansion coefficients, wherein one of said at least two layers of materials is an organic material having nanoparticles incorporated therein to form a composite coating.

20. The method according to claim 19 further comprising the step of providing an absorbing structure in thermal communication with at least one of said layers of materials.

21. A method of increasing the sensitivity of an infrared radiation detector that operates by tilting an illumination reflector supported by a thermally deformable cantilever beam, said method comprising the steps of:

providing a composite coating on the cantilever beam, said composite coating including an organic material having nanoparticles incorporated therein, projecting illumination emitted from at least two illumination sources onto the illumination reflector, and reflecting illumination from a first one of said illumination sources to a sensor if the illumination reflector is tilted at a first angle, and reflecting light from a second one of said illumination sources to said sensor if the illumination reflector is tilted at a second angle.

22. The method according to claim 21 wherein a first one of said illumination sources provides optical illumination at a first wavelength and a second one of said illumination sources provides optical illumination at a second wavelength.

23. The method according to claim 21 further comprising the step of spatially restricting illumination emitted by said first optical illumination source for irradiating said sensor.

24. The method according to claim 21 further comprising the steps of:

providing output signals from a sensor over a first dynamic range when illumination from one said illumination source irradiates said sensor; and providing output signals from said sensor over a second dynamic range when illumination from a second said illumination source irradiates said sensor.

* * * * *